United States Patent [19]

Steinke

[11] Patent Number: 5,311,564
[45] Date of Patent: May 10, 1994

[54] SPACER FOR FUEL ASSEMBLIES

[75] Inventor: Alexander Steinke, Ebermannstadt, Fed. Rep. of Germany

[73] Assignee: Siemens Aktiengesellschaft, Munich, Fed. Rep. of Germany

[21] Appl. No.: 925,980

[22] Filed: Aug. 5, 1992

[30] Foreign Application Priority Data

Aug. 15, 1991 [EP] European Pat. Off. ......... 91113145.6

[51] Int. Cl.⁵ .............................................. G21C 3/34
[52] U.S. Cl. ...................................... 376/441; 376/442
[58] Field of Search .............. 376/442, 441, 438, 462; 976/DIG. 76, DIG. 79, DIG. 103

[56] References Cited

U.S. PATENT DOCUMENTS

| | | | |
|---|---|---|---|
| 3,679,546 | 7/1972 | Muellner et al. | 376/356 |
| 3,772,148 | 11/1973 | Seddon | 376/441 |
| 3,852,154 | 12/1974 | Carlson | 376/442 |
| 3,886,038 | 5/1975 | Raven | 376/442 |
| 4,312,705 | 1/1982 | Steinke | 376/441 |
| 4,389,369 | 6/1983 | Bryan | 376/442 |
| 4,396,573 | 8/1983 | Feutrel | 376/442 |
| 4,885,127 | 12/1989 | Yokoyama | 376/462 |
| 5,078,961 | 1/1992 | Johansson et al. | 376/448 |

FOREIGN PATENT DOCUMENTS

| | | |
|---|---|---|
| 0033263 | 8/1981 | European Pat. Off. . |
| 0141208 | 5/1985 | European Pat. Off. . |
| 0395509 | 10/1990 | European Pat. Off. . |
| 1814297 | 3/1970 | Fed. Rep. of Germany . |
| 1489632 | 2/1973 | Fed. Rep. of Germany . |
| 3139823 | 5/1982 | Fed. Rep. of Germany . |
| 2449324 | 9/1980 | France . |

Primary Examiner—Donald P. Walsh
Assistant Examiner—Meena Chelliah
Attorney, Agent, or Firm—Herbert L. Lerner; Laurence A. Greenberg

[57] ABSTRACT

A gridlike spacer for fuel assemblies having rods in a bundle, includes polygonal grid meshes having ribs intersecting at corners and extending transversely to the rod bundle between the rods of the rod bundle. The ribs have lateral surfaces facing the rods penetrating the meshes. Springs each protrude diagonally into at least one corner of a respective one of at least a majority of the grid meshes. Each of the springs has a middle part for laterally supporting a given rod penetrating the respective mesh. The middle part is a cylinder segment curved convexly about an axis of curvature at right angles to the rod bundle. Each of the springs has two spring ends adjoining one another in the direction of the rod bundle. The middle part changes over at the spring ends with a convex curvature into two legs being approximately parallel to the rod bundle. The legs are supported at least on the lateral surface of one of the ribs facing toward the given rod.

24 Claims, 10 Drawing Sheets

SPACER FOR FUEL ASSEMBLIES

The invention relates to a gridlike spacer for fuel assemblies, with grid meshes through which rods are guided, and with springs for lateral support of the rods on ribs of the grid.

Nuclear reactor fuel assemblies always contain a bundle or cluster of fuel rods. In pressurized water reactors, rods constructed as guide tubes or instrumentation tubes are also distributed in the bundle and in the case of boiling water reactors the bundles can contain so-called water rods. Such specially constructed rods often have a larger cross section than the fuel rods and are joined to gridlike spacers in a plurality of axial positions through non-elastic elements.

The grid meshes in the spacers are formed by ribs that extend between the rods of the bundle and are aligned crosswise to the rods. The ribs serve to fix the lateral position of the rods. For instance, polygonal grid meshes are formed by intersecting webs in FIGS. 2-6 of German Published, Non-Prosecuted Application DE-OS 28 23 899 and in FIG. 9 of Published European Application No. 0 033 263 A3, corresponding to U.S. Pat. No. 4,411,862. Except for grid meshes that are penetrated by the aforementioned guide tubes, instrumentation tubes or water rods, all of the meshes in such known spacers include two springs, which are disposed in the middle between two corners of the mesh.

Each of those springs has at least one middle part, which is curved convexly about an axis of curvature that is at right angles to the rod bundle and takes the form of a segment of a cylinder. The applicable rod is supported on it.

In such known springs, at the two adjoining lateral surfaces in the direction of the rod bundle, the middle part changes over with convex curvatures into two legs that are parallel to the rod bundle, which are supported on a side which faces toward the rod of one of the ribs that form the grid mesh. One of the two legs is bent in hairpin fashion about one edge of the rib and forms a form-locking fastening of the spring on the rib. A form-locking connection is one which connects two elements together due to the shape of the elements themselves, as opposed to a force-locking connection, which locks the elements together by force external to the elements. On the back of the rib, the leg that is bent double can be constructed in a mirror image of the spring parts on the front of the rib, resulting in a double spring resting flat on a shared rib and being shared by two adjacent meshes.

Such a spring cannot be used at the peripheral ribs of spacers in pressurized water reactors, because the outer surfaces of such spacers have to be smooth to prevent them from catching on adjacent fuel assemblies.

A similar spring with a plate-like cross section is shown in FIGS. 5-7 of German Published, Prosecuted Application DE-AS 1 489 632. The meshes of that grid are formed by cans that are slipped over the fuel rods and welded together.

According to FIG. 4 of German Published, Prosecuted Application DE-AS 1 489 632, a C-shaped cross section of the middle part is also possible, wherein at the ends of the spring it changes over into the legs, with two convex curvatures. The legs are guided through a window in the rib, on the back of the rib, as far as the upper and lower edge of the can, where they are bent around the rib and are again retained in form-locking and force-locking fashion. In order to insert the spring, the window is at least large enough to ensure that the C-shaped middle part fits all of the way into it and is freely movable in it. That means a very long spring travel, which nevertheless results in a disadvantageous distribution of force, although it assures greater elasticity of the spring as compared with the plate-like spring forms, because in the beginning the force-locking connection of the bent-double ends of the legs is available for supporting the springs on the rib. Another disadvantage is that the C-shaped spring cannot be constructed as a double spring and therefore can only be employed for can-like grid ribs. In the grid meshes, the fuel rods are usually pressed by the springs against stop knobs in the meshes. In the construction of the spring, the heavy load on the spring due to the occurrence of a temperature fluctuation of approximately 300° C., the occurrence of a turbulent flow, a change in diameter of the rods from a pressure load, and the increase in size of the spacer cell and the loss of the spring force from neutron radiation, must all be taken into account. The turbulent flow of the coolant, which is associated with a high flow speed, causes vibration of the fuel rods. The fuel rods rub against the bearing points and the spring, causing material fatigue at the stop knobs, and on the spring and the fuel rods. The spacer must therefore support a bundle of parallel fuel rods in such a way that no scuffing occurs at the bearing points. The various spring shapes or forms meet such requirements in quite different ways and require specific material properties that are often difficult to achieve. Moreover, care must be taken to provide a low flow resistance and pressure loss of the coolant at the springs.

It is accordingly an object of the invention to provide a spacer for fuel assemblies, which overcomes the hereinaforementioned disadvantages of the heretofore-known devices of this general type and which creates a new spacer especially adapted to such requirements that enables secure support of the rods, particularly as a result of especially advantageous elasticity properties. With the foregoing and other objects in view there is provided, in accordance with the invention, in a fuel assembly, particularly of a pressurized water reactor, having rods in a bundle, a gridlike spacer, comprising polygonal grid meshes having ribs intersecting at corners and extending transversely to the rod bundle between the rods of the rod bundle, the ribs having lateral surfaces facing the rods penetrating the meshes; springs each protruding diagonally into at least one corner of a respective one of at least a majority of the grid meshes, each of the springs having a middle part for laterally supporting a given rod penetrating the respective mesh, the middle part being approximately a cylinder segment curved convexly about an axis of curvature at right angles to the rod bundle; and each of the springs having two spring ends adjoining the middle part in the direction of the rod bundle, the middle part changing over at the spring ends with a convex curvature into two legs being approximately parallel to the rod bundle, the legs being supported at least on the lateral surface of one of the ribs facing toward the given rod.

Accordingly, in the unloaded state, the spring describes the shape of a C, with a hollow cylindrical segment extending between two legs.

With this shaping, the legs adjoining the middle part come to rest between the middle part and solid parts of the rib, at which they are supported and form-lockingly held.

As soon as any window opening becomes necessary in the rib for inserting the spring, this window opening can be shifted toward the axis of curvature with respect to the middle part, and moreover, the cross section of the window opening that is necessary for insertion of the spring can be selected to be smaller than the cross section of the middle part, since the middle part can be temporarily and elastically bent together from pressure on the spring ends, so far that it can also be passed through a smaller window. In the installed state of the spacer, parts of the middle part therefore face solid parts of the rib. In other words, they sometimes cover parts of the aforementioned window opening, but they at least also cover solid rib parts, which are therefore available for supporting and form-lockingly holding the legs.

As a result, for a given axial height of the spacer, the middle part can extend almost to the edges of the ribs, resulting in a long spring length in the direction of the rod bundle. The C shape itself also assures a long spring stroke when the spring is loaded, so that on one hand a fuel rod can be inserted into or pulled out of the mesh easily, and on the other hand, at a low tension level, it can be fastened in place with a pressure adapted to requirements. The distribution of tension in the spring is advantageous and leads to excellent elasticity properties, even over long periods of use.

It is moreover possible to place the spring in the corners of the mesh with a middle part pointing diagonally inward. The legs are then supported on two intersecting ribs, and a second elastic spring can be dispensed with. This leads to a surprisingly low pressure loss. Such diagonal springs may also be constructed as double springs.

In accordance with another feature of the invention, the spring has a radius of curvature and an axial length being approximately equal in an installed state.

In accordance with a further feature of the invention, the spring has a wall thickness to which the radii of the convex curvature of the spring ends are adapted.

In accordance with an added feature of the invention, the middle part ends in parts of the legs being inclined at an angle of inclination relative to an installation direction and converging toward one another, at least before installation of a fuel rod, with the angle of inclination being under 10° and preferably approximately 4°.

In accordance with an additional feature of the invention, the legs of one of the springs converge and have ends being spaced apart from one another by a distance enabling a compression of the springs ends upon insertion of the spring into one of the grid meshes.

In accordance with yet another feature of the invention, at least one of the spring ends has a profile form-lockingly fastening the spring to one of the ribs.

In accordance with yet a further feature of the invention, the majority of the grid meshes each contain a single spring.

In accordance with yet an added feature of the invention, the majority of the grid meshes have only one spring pointing diagonally inward, and two of the ribs facing the diagonally inwardly pointing spring in each of the meshes have at least one stop knob for a rod.

In accordance with yet an additional feature of the invention, the intersecting ribs of one of the meshes are first and second ribs, at least one and preferably both of the spring ends has first and second lateral tabs, the first tab penetrates an opening formed in the first rib and has at least one notch formed therein for form-lockingly retaining the first tab in the opening in the first rib, and the second tab rests on the second rib.

In accordance with still another feature of the invention, the first tab passes through the opening in the first rib twice, and the first tab has at least one second notch for locking the first tab.

In accordance with still a further feature of the invention, the second tab also penetrates the opening in the first rib and has at least on notch formed therein for locking the second tab in the opening in the first rib.

In accordance with still an added feature of the invention, the tabs are bent into a triangle having one side on which the middle part is located.

In accordance with still an additional feature of the invention, the ribs have lateral surfaces facing toward and facing away from the grid mesh, the first tab penetrating the first rib rests on the lateral surface of the first rib facing away from the grid mesh, and the second tab rests on the lateral surface of the second rib facing toward the grid mesh.

In accordance with again another feature of the invention, the intersecting ribs of the meshes are first and second ribs, each two of the grid meshes being disposed next to one another and separated by the first rib contain one spring from among the majority of the grid meshes; the spring ends of both of the springs have a side facing away from the first rib being supported on the second rib; and both of the springs have at least one first spring end with a side facing toward the rib having a first connecting part joining the two springs and penetrating a first opening formed in the first rib.

In accordance with again a further feature of the invention, the connecting part has at least one notch formed therein for form-lockingly retaining the connecting part in the first opening in the first rib.

In accordance with again an added feature of the invention, in at least one and preferably both of the springs, the side of the first spring end facing away from the rib has a first lateral tab supported on the second rib, the first lateral tab penetrates the opening in the first rib and has a notch formed therein for form-lockingly retaining the first lateral tab in the first opening in the first rib.

In accordance with again an additional feature of the invention, there is provided a second lateral tab, the connecting part and the two lateral tabs being bent into an equilateral triangle having a base resting on the second rib and sides on which the middle parts of the springs facing into adjacent meshes are located.

In accordance with another feature of the invention, at least one and preferably both of the springs has a second spring end with a side facing away from the rib having a second lateral tab supported on the second rib, the second lateral tab penetrates a second opening formed in the first rib and has a notch for locking the second lateral tab in the second opening formed in the first rib.

In accordance with a further feature of the invention, there is provided another or second connecting part penetrating a second opening formed in the first rib and joining together two spring ends of both of the springs.

In accordance with a concomitant feature of the invention, there is provided at least one clamp being fastened and preferably welded-on to the sheet metal of one of the ribs and reaching through an opening formed in one of the spring ends of the spring preferably disposed in at least one corner of at least one of the grid meshes among the total number of grid meshes. This spring is especially used in a mesh at one of the corners of the spacer.

Other features which are considered as characteristic for the invention are set forth in the appended claims.

Although the invention is illustrated and described herein as embodied in a spacer for fuel assemblies, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
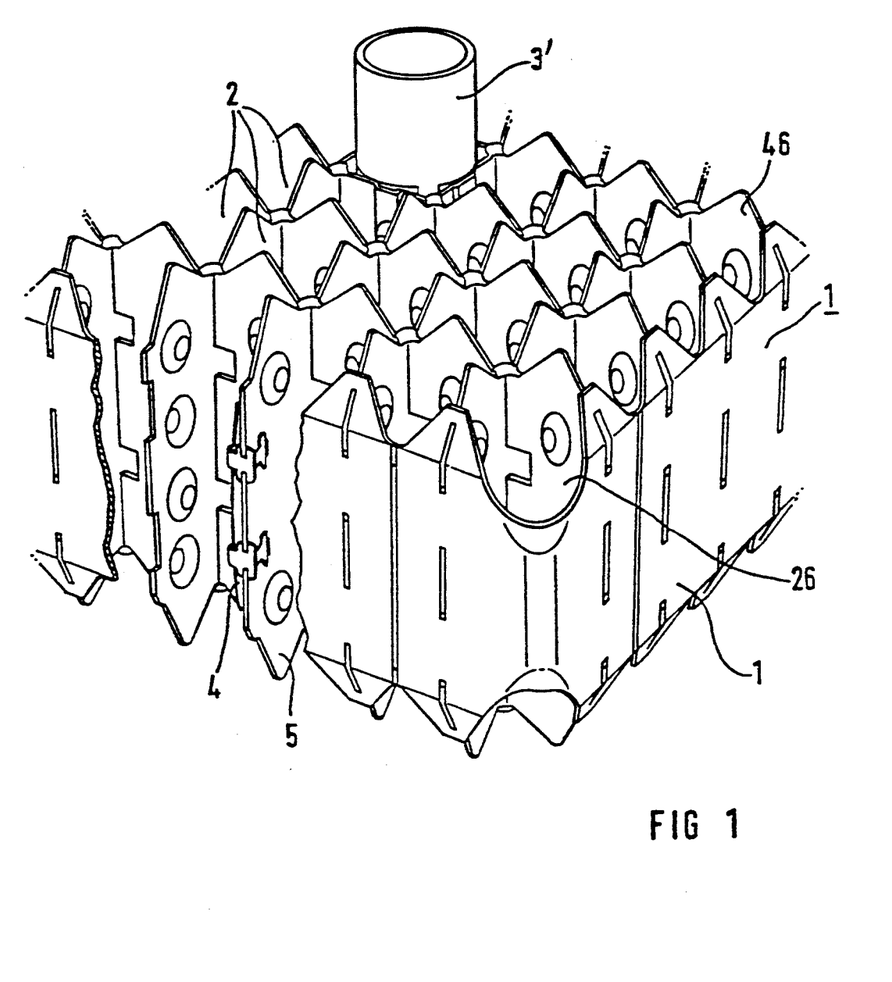
FIGS. 1 and 2 are fragmentary, diagrammatic, perspective views of two examples of a spacer according to the invention.
Figure 2:
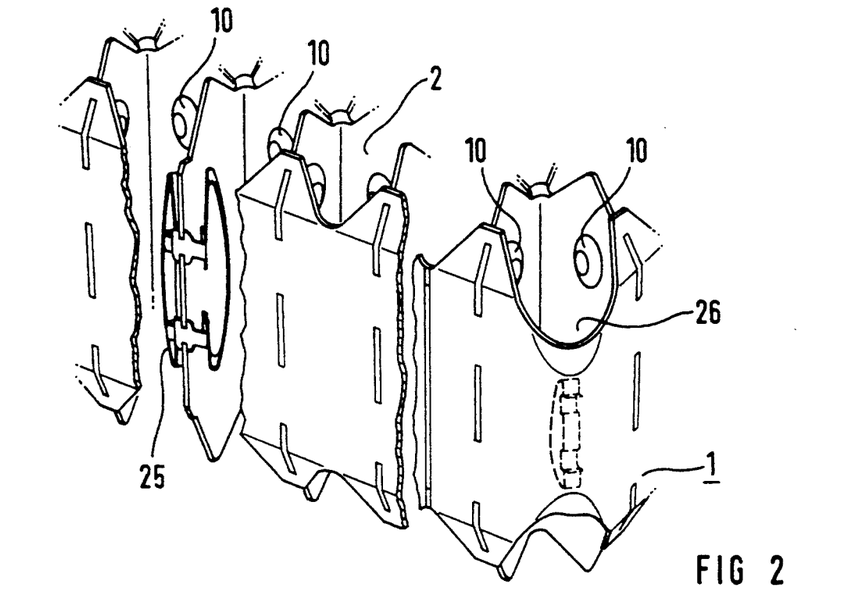

Referring now to the figures of the drawing in detail and first, particularly, to FIGS. 1 and 2 thereof, there is seen a gridlike spacer 1 for fuel assemblies which includes grid meshes, spaces or openings 2, through which rods, in particular fuel rods 3 and guide tubes 3 of a pressurized water reactor in a rod bundle or cluster, are passed, and springs for lateral support of the rods 3 on ribs 5 of the grid of the spacer. In FIG. 1, the spacer has a spring 4 in the meshes which is shown in detail in FIGS. 6-8, and in FIG. 2, it has a spring 25 which is shown in detail in FIGS. 13-15. The springs include a middle part 6 that is convexly curved toward the rod 3 and has an axis of curvature approximately at right angles to the rod, and two spring ends 7 adjoining the middle part 6, each having one leg 8 that is retained on the rib 5 and extends approximately parallel to the rod. In these springs, not only is the middle part 6 curved convexly toward the rod 3, but in each case the middle part 6 also changes over into the legs 8 of the spring ends 7 with a convex curvature. This spring form has very high elasticity with a long spring length and adequate spring travel. Fuel rods can easily be pulled out and inserted again. Due to the curved bearing surface between the spring 4 and the rod 3, scuffing is largely avoided.

Figure 3:
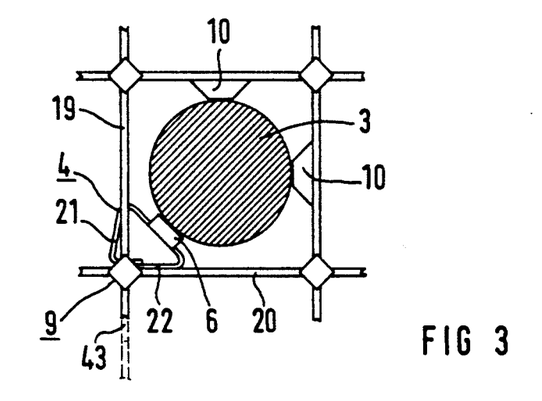
FIG. 3 is a fragmentary, plan view of a mesh of the spacer with a single spring.
Figure 4:
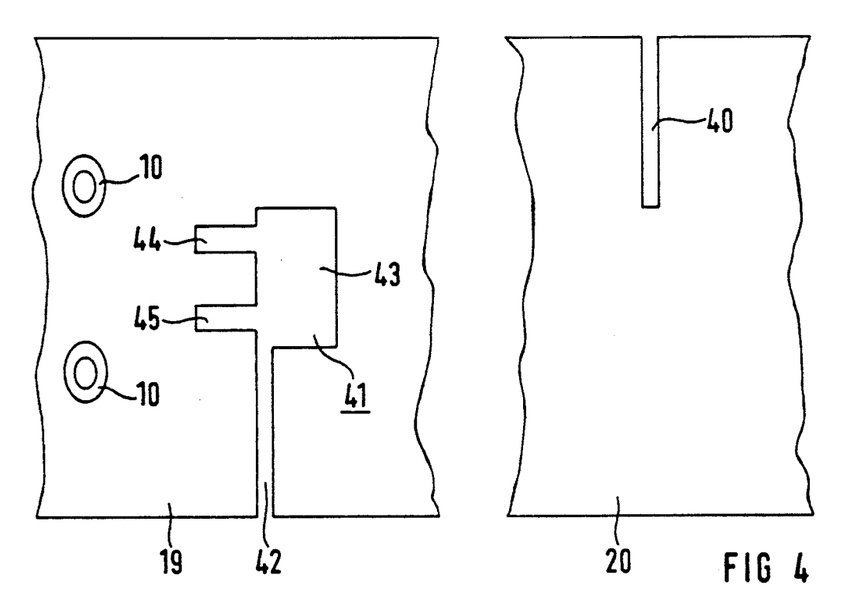
FIG. 4 is fragmentary, side-elevational view of rib parts, with blind slits that are also used for introducing and locking the spring.

The grid meshes 2 are formed by the intersecting ribs 5. FIGS. 3 and 4 show part of a first rib 19 and a second rib 20, which carry corresponding blind slits 40, 42 where they intersect, so that they fit together. At an intersection, a rib 19 has an opening 41 through which the spring can be introduced. The spring can optionally be compressed by a slight pressure, in order to make do with smaller openings 43. Inserting the rib 20 then locks the spring on the rib 19 in such a way that the spring rests with its legs on the rod-facing inner surfaces of the ribs 19 and 20 which form the mesh and is formed-lockingly held on the rib 19.

Figure 5:
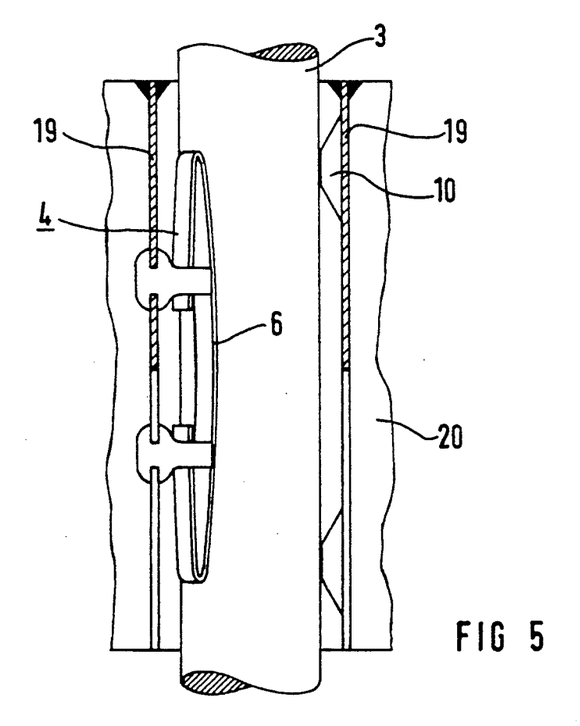
FIG. 5 is a fragmentary, cross-sectional view of a mesh of a spacer with a fuel rod.

As can be seen from FIG. 3, the spring 4 is preferably disposed at the intersections 9 of the ribs 19 and 20 and points diagonally into the grid meshes 2. Each grid mesh 2 preferably has a square cross section, and besides the spring 4 it also has two stop knobs 10 for one rod 3. The stop knobs 10 are disposed on the two sides of the mesh opposite the spring. The spring 4 thus supports the rod 3 against the stop knobs 10. The spring form according to the invention is very well suited for damping vibrations that occur, as is best see in FIGS. 1 and 5.

Figure 6:
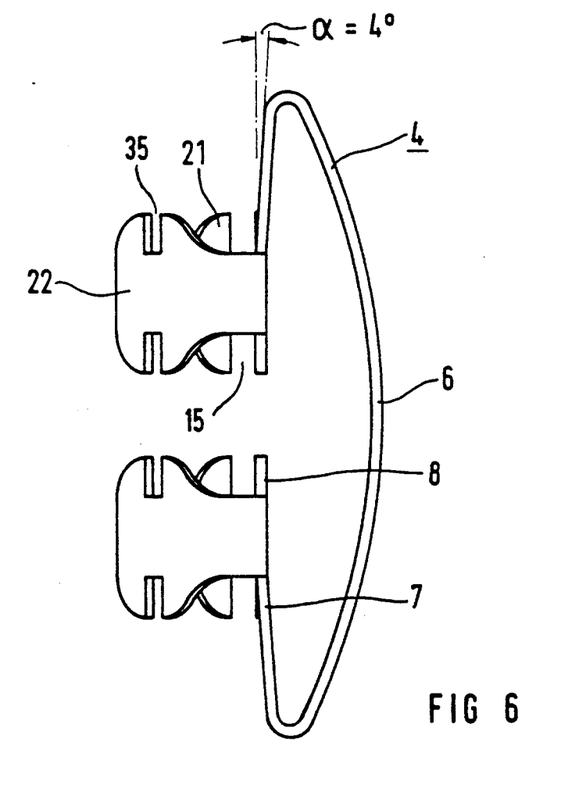
FIGS. 6-8 are a respective side-elevational view, plan view and view of the upper spring parts being bent onto one plane, of an embodiment of the spring according to the invention as a single spring.

A good view of the spring 4 of the invention is provided in FIG. 6. Its shape is similar to a jacket segment of a hollow cylinder, which has a convex curvature that changes over into the two legs 8, that are retained on the inside of the ribs, at the spring ends 7. It is advantageous if the radius of curvature of the spring 4 is approximately equal to the axial length of the spring 4 in the installed state. With this structure, a low tension level is achieved, which is equivalent to optimal support of the spring under the prevailing conditions. In manufacture, it is advantageous if the radii of curvature of the springs ends 7 are adapted to the wall thickness of the spring 4. In the case of a spring made of a nickel-based alloy, for instance, the internal radius of curvature of the spring ends may be approximately 1 to 2 times the spring thickness.

According to the invention, the spring preferable ends in the form of the legs 8, which have parts adjoining the convex curvature that are inclined relative to the ribs and converge toward one another, at least before a fuel rod is installed. After installation, the inserted fuel rods slightly deform the convex ends so that angle alpha is cancelled. It is advantageous if the angle of inclination alpha is kept small, in other words less than 10° and advantageously approximately 4°. The legs 8 of the spring 4 converge towards one another except for a certain spacing. As a result of this distance between the springs ends 7, compression of the spring ends 7 upon insertion into the grid meshes 2 becomes possible. At least one spring end 7, and preferably both, carry a profile with which the spring 4 is formlockingly fastened to a rib 5. Fastening with one spring end 7 is possible, but a second fastening at the other spring end 7 provides additional stability.

Figure 9:
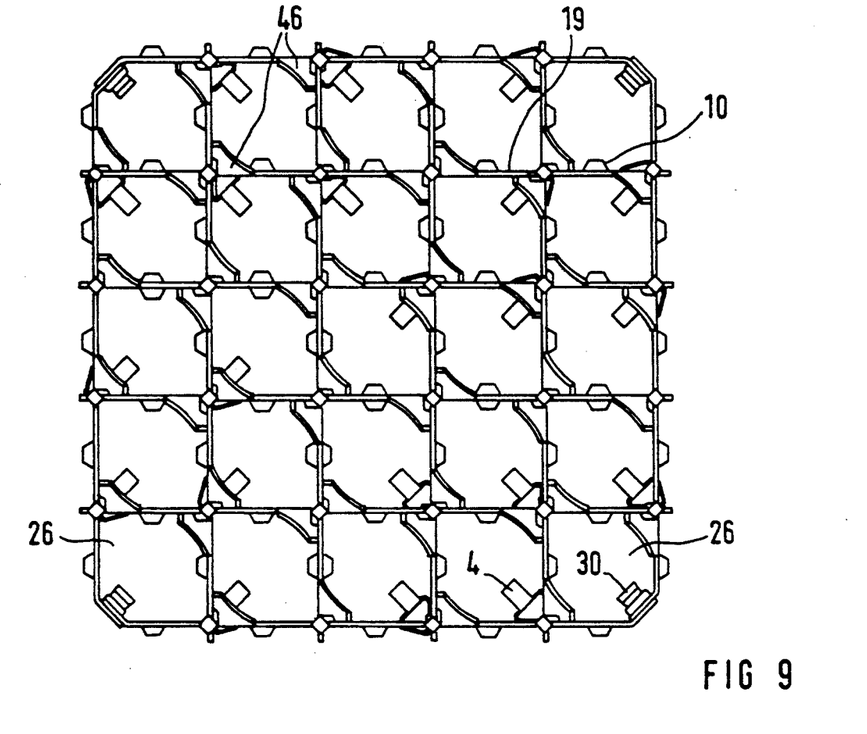
FIG. 9 is a plan view of the spacer with installed single springs and corner springs for a boiling water reactor.
Figure 10:
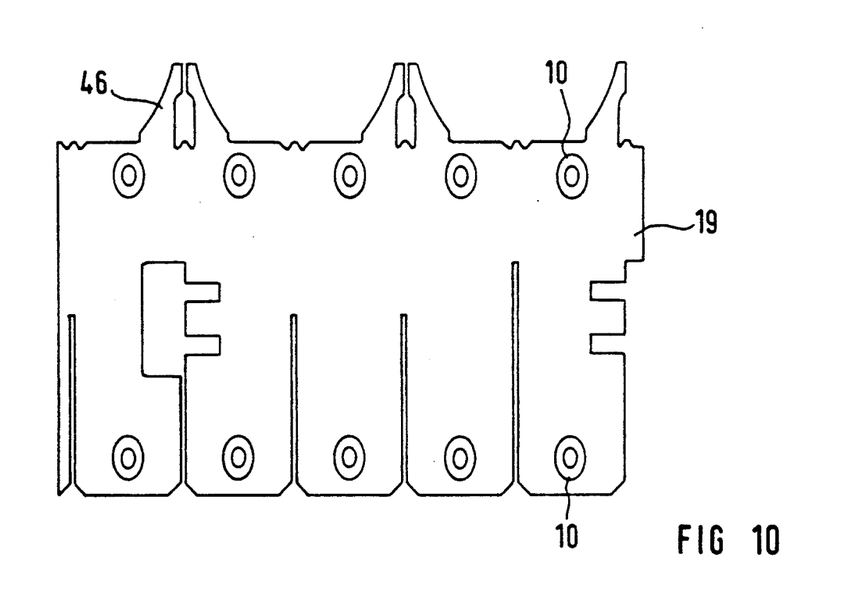
FIG. 10 is a side-elevational view of the rib of the spacer with built-in single springs.

FIG. 9 shows a spacer of a boiling water fuel assembly, and FIG. 10 shows the rib 19 of this spacer. In this especially practical embodiment, single springs 30 are disposed in the corner meshes of the spacer.

In pressurized water reactors, the outer ribs are equipped without protruding spring ends. In particular, the single springs 30 of corner meshes 26 of the spacer 1 are secured in such a way that there are no edges, protrusions or apertures that would hinder sliding of the spacers of adjacent fuel assemblies along one another.

Figure 11:
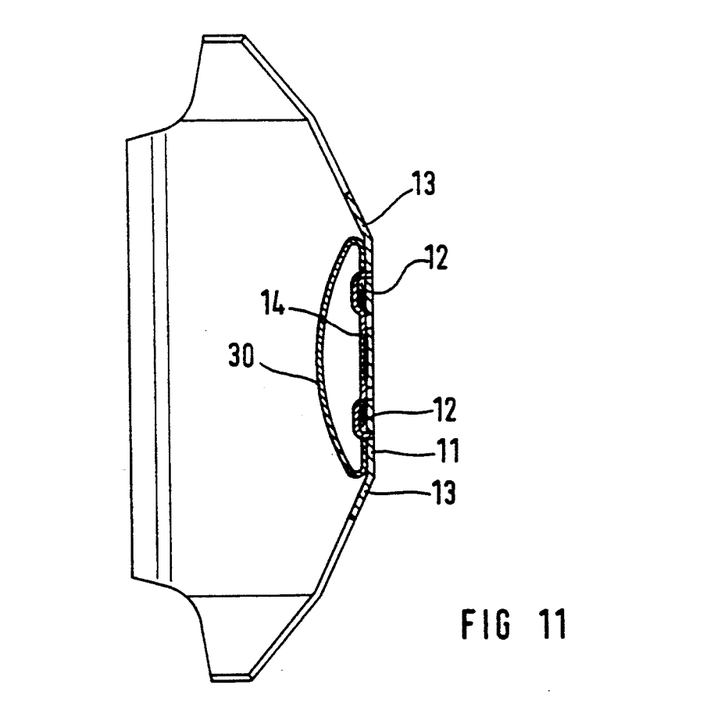
FIGS. 11 and 12 are a respective longitudinal-sectional and plan view of an embodiment of the spring according to the invention as a corner spring.
Figure 12:
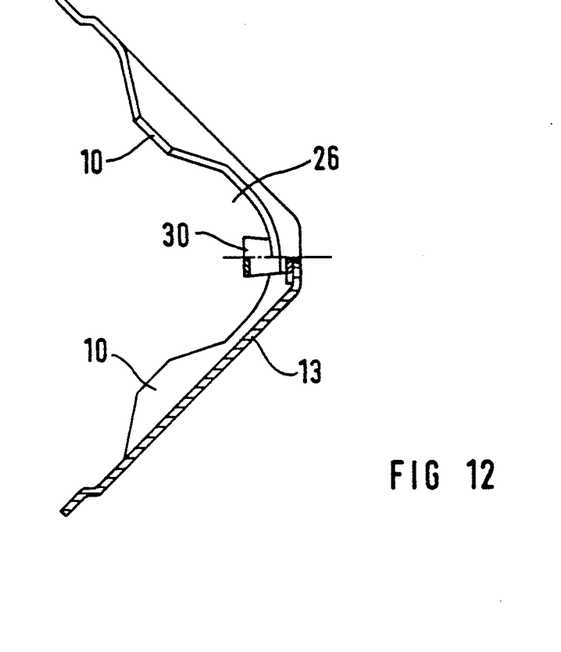

The corresponding retention of the corner spring is shown diagrammatically in FIGS. 11 and 12. FIG. 11 shows an exemplary embodiment of a corner spring 30, which is secured in a corner of a corner mesh 26 of the spacer 1, as is seen in FIG. 12. At least one and preferably both spring ends 7 are provided with at least one opening 12, through which at least one clamp 14 reaches. The clamps 14 are fastened to the rib or to a rib corner 13. Given a suitable material for the clamp, it can advantageously be welded to the sheet metal of the rib.

In the case illustrated, the spacer rib, the spacer corner and the clamp 14 are all made of "ZIRCALOY", while the spring 4 is made of a nickel-based alloy. By welding the clamp 14 to the spacer rib, the spring 4 can be form-lockingly held. With the fastening option shown, the outer contour of the ribs in the corner region of the spacer 1 is not hindered, nor is the shape of the ribs 5 affected. As a result of this variant installation of the spring, problems such as elements catching on one another in remote-controlled handling of the structural elements in the reactor core, can be avoided.

Figure 7:
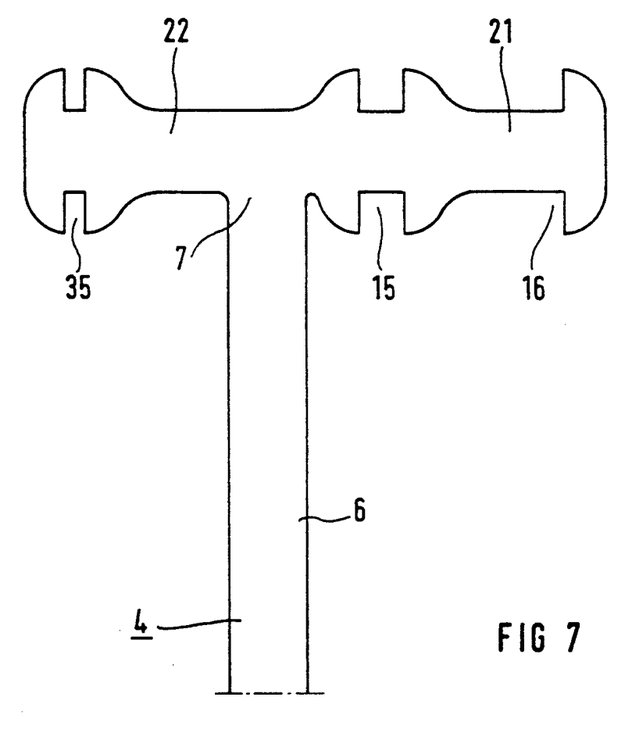
Figure 8:
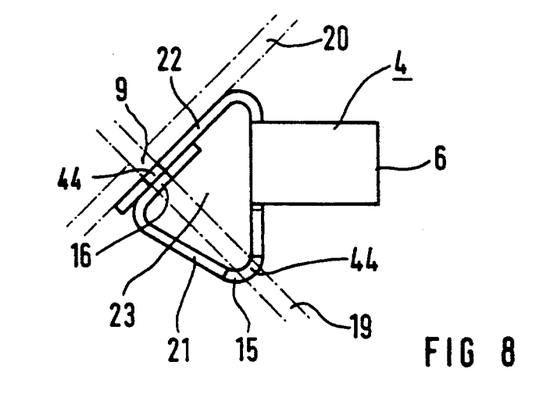

A further exemplary embodiment of a single spring, which is suitable for a pressurized water fuel assembly of FIG. 1 or a boiling water fuel assembly of FIG. 9, is shown in FIGS. 6, 7 and 8. One spring end 7 of the spring 4 has two lateral tabs 21, 22, through which the spring 4 can be secured to a first rib 19. To this end, as is seen in FIG. 4, openings in the form of the slits 40 are provided in a second rib 20, and apertures 41 that are adapted to the spring form are provided in the first rib 19 disposed at right angles to the second rib 20. The apertures in the ribs are shown in FIG. 8. Fastening the spring through this kind of intermeshing apertures and slits is already known from U.S. Pat. No. 4,312,705. The two tabs 21, 22 are bent to form a triangle 23, on one side of which the middle part 6 of the spring 4 is located.

The aperture 41 includes an assembly opening 43 on one side of the slit 42 and at least one opening (for instance, a first opening 44 oriented toward the upper spring end) on the other side of the slit. For assembly, the spring is first introduced into the assembly opening 43 in such a way that the tab 21 comes to rest on one side of the first rib 19, for instance the back, and the convex middle part 6 comes to rest on the other side (for instance, the front). The spring 4 is then shifted laterally so that the tab 21 is thrust into the openings 44 and penetrates the rib 19 there. The slit 42 is released in the process and can receive the second rib 20, which in this position then locks the spring.

As can be seen from FIGS. 3–8, the first tab 21 has a notch 15 and penetrates the opening 44 in the first rib 19. The tab 21 has a notch 15 with which it is form-lockingly held in the opening in this first rib 19. The second tab 22 rests on the second rib 20 that intersects the first rib 19. It is advantageous if the first tab 21 passes through the opening in the first rib 19 twice, and if at least one second notch 16 is provided for form-locking retention of the first tab 21.

It proves to be advantageous if the second tab 22 likewise passes through an opening (e.g. the same opening 44) in the first rib 19 and has at least one notch 35, with which it is form-lockingly retained in the opening in this first rib 19.

It is shown clearly in FIGS. 3 and 9 that after the fastening, the first tab 21 that passes through the first rib 19 fits over the lateral surface of the first rib 19 facing away from the grid mesh 2, and the second tab 22 rests on the lateral surface of the second rib 20 facing toward the grid mesh 2.

It is advantageous if the second spring end 7 likewise has two lateral tabs which pass through a second opening 45 in the first rib 19, and if the second spring end 7 is fastened in the second opening 45 of the first rib, in a manner analogous to that for the first spring end 7.

With the two embodiments described so far, the spacer 1 as seen in FIGS. 9 and 1 can be used for both boiling water fuel assemblies and pressurized water fuel assemblies. The spacer 1 may have a rectangular cross section, and the corner meshes 26 of the grid each have one of the corner springs 30 described above, which are oriented diagonally into the corner mesh 26 from the corner of the cross section. The other grid meshes 2 have the single springs 4, which are fastened as described above and likewise are oriented diagonally into the grid meshes 2. In summary, fastening of the springs can be attained in such a way that the common form of the ribs is only very slightly affected, as is seen in FIG. 4. The spacer frequently has surfaces on its top that create a coolant flow oriented along the spacer, and that serve as flow baffles 46.

Figure 13:
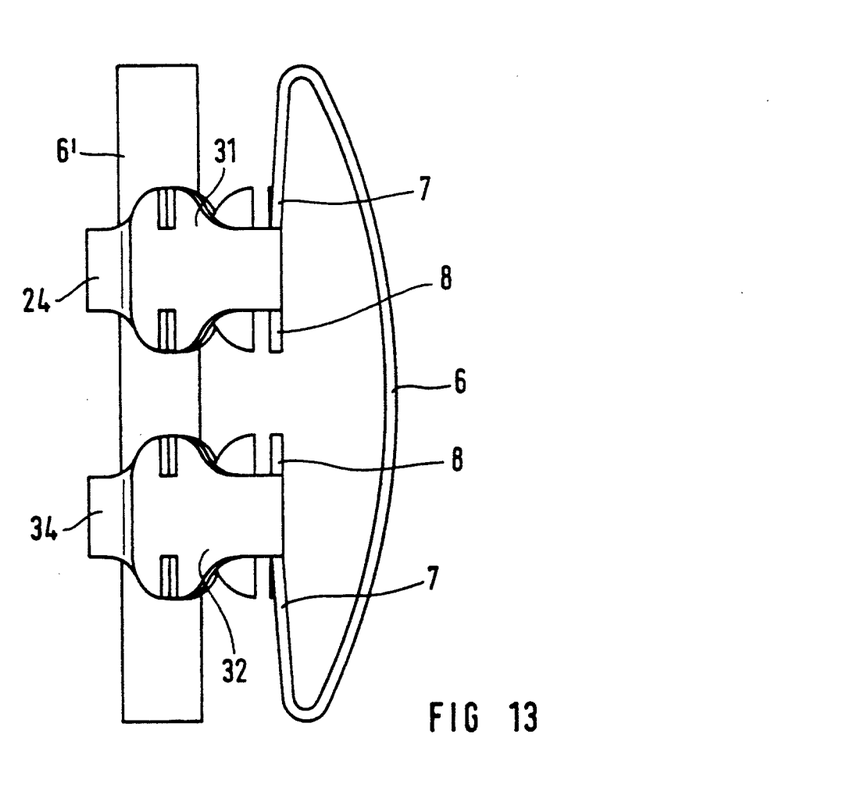
FIGS. 13-15 are views corresponding to FIGS. 6-8 of an embodiment of the spring as a double spring.
Figure 14:
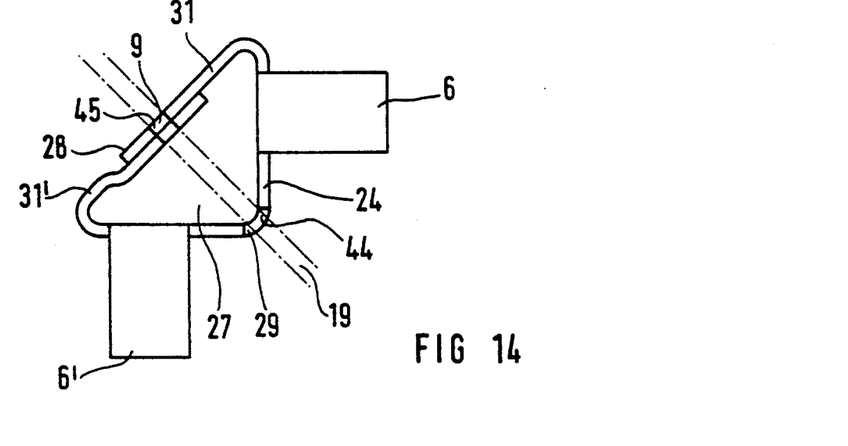
Figure 15:
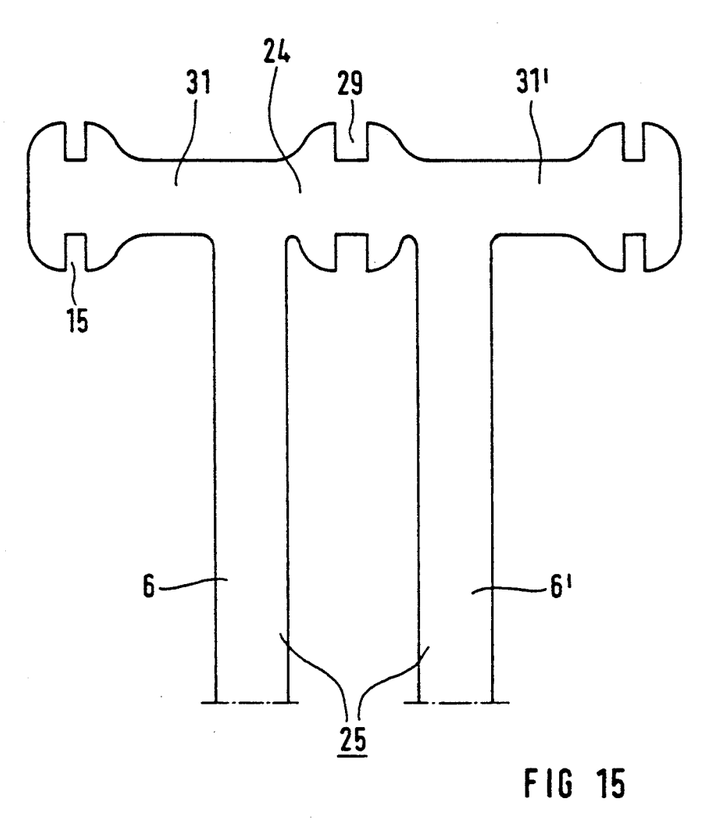
Figure 16:
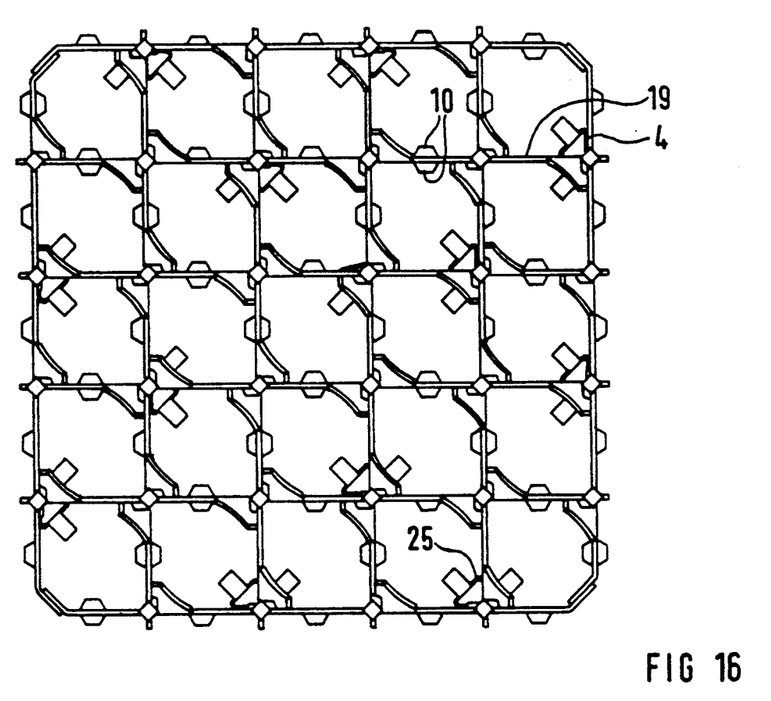
FIG. 16 is a plan view of the spacer with built-in double springs and one single spring.
Figure 17:
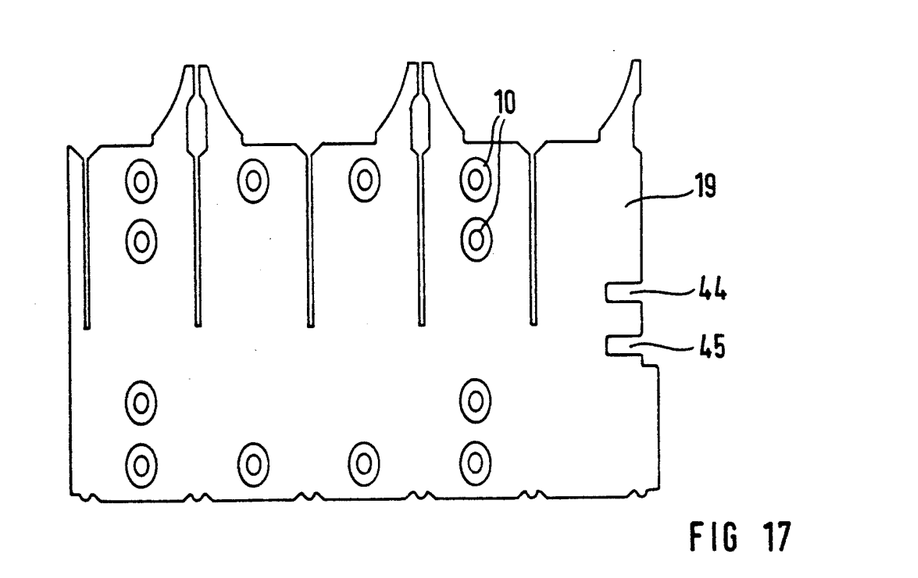
FIG. 17 is a side-elevational view of a rib of the spacer constructed for the installation of double springs.

A third exemplary embodiment of the spring according to the invention is shown in FIGS. 13, 14 and 15, while the installation of the spring in the spacer is shown in FIGS. 16 and 17. The spring of the third exemplary embodiment is inserted into the ribs in the manner above described for the second exemplary embodiment. One end of each of two springs ("partial springs") is joined to one middle part 6, 6' and each of at least one lateral tab 31, 31' is joined by means of a first connecting part 24, to make a double spring 25. The connecting part 24 penetrates an opening in a first rib 19, so that one spring comes to rest on one side of the first rib 19, for instance the back, and the other spring comes to rest on the other side of the first rib, for instance the front. The connecting part 24 has at least one notch 29, with which the double spring 25 is form-lockingly retained in the opening in the first 19. The springs are secured in different meshes and are oriented diagonally into the meshes, while the two lateral tabs rest on an surface of a second rib 20 intersecting the first rib 19, with the surface being oriented toward the adjacent meshes.

At least one lateral tab 31 and preferably each of the two tabs 31, 31' penetrates the opening in the first rib 19 and again has at least one notch 15, with which it is formlockingly retained in the opening 44 of the first rib 19. Preferably, the connecting part 24 and the two lateral tabs 31, 31' are again bent to form an equilateral triangle 27. The triangle is fastened in such a way that its base 28 rests on the second rib 20, and the springs that are oriented into adjacent meshes are located on the sides of the triangle. In this embodiment as well, it is advantageous if the other ends of the two springs are also joined by a second connecting part 34, which penetrates the second opening 45 in the first rib 19, and if the other ends 7 of the two springs are fastened in the second opening, analogously to the procedure for the first ends of the two springs, since this provides increased stability.

FIG. 16 is a plan view of the spacer 1 with installed double springs 25.

If an uneven number of meshes and an uneven number of required rods are left over after the meshes that contain water rods, guide tubes, and so forth are subtracted, then a single spring can be introduced into one mesh (for instance, the central mesh of FIG. 16). Corner springs are not needed. The number of individual parts and operations is low, especially when the double springs are used, and spring parts protruding past the outer surfaces of the spacer, which can be a problem especially in pressurized water reactors, are avoided.

The rib 19 shown in FIGS. 10 and 17 makes it clear that practically the only supplementation needed for the conventional rib form is to provide the corresponding openings 44 and 45, in which the springs are retained, and corresponding assembly openings 43 (which are not necessary for the rib of FIG. 17) for inserting the springs.

In order to provide a form-locking connection of the spring ends or tabs, a certain play is certainly allowed, since the rods press against the springs in the installed state, and the lateral surfaces of the legs are firmly supported on the inner surfaces of the ribs forming the meshes through the slits in the tabs and connecting parts, without individual spring parts being excessively strained and threatened with breakage, even if the fuel rod vibrates. The shaping of the springs is advantageous both for the sake of elasticity and the distribution of forces, and for the sake of the flow of the coolant.

I claim:

1. In a fuel assembly having rods in a bundle, a gridlike spacer, comprising:
    a) polygonal grid meshes having ribs intersecting at corners and extending transversely to the rod bundle between the rods of the rod bundle, said ribs having lateral surfaces facing the rods penetrating said meshes;
    b) springs each protruding diagonally into at least one corner of a respective one of at least a majority of said grid meshes, each of said springs having a middle part for laterally supporting a given rod penetrating said respective mesh, said middle part being an approximately cylindrical segment curved convexly about an axis of curvature at right angles to the rod bundle;
    c) each of said springs having two spring ends adjoining said middle part in the direction of the rod bundle, said middle part changing over at said spring ends with a convex curvature into two legs being approximately parallel to the rod bundle, and means for supporting said legs on said lateral surfaces of two adjacent ones of said ribs facing toward the given rod; and
    d) the majority of said grid meshes having only one spring pointing diagonally inward, and two of said ribs facing said diagonally inwardly pointing spring in each of said meshes having at least one stop knob for a rod.

2. The gridlike spacer according to claim 1, wherein said spring has a radius of curvature and an axial length being approximately equal in an installed state.

3. The gridlike spacer according to claim 1, wherein said spring has a wall thickness and the radius of the convex curvature of said spring ends are approximately 1 to 2 times the wall thickness.

4. The gridlike spacer according to claim 1, wherein said middle part ends in parts of said legs being inclined at an angle of inclination relative to an installation direction and converging toward one another, at least before installation of a fuel rod.

5. The gridlike spacer according to claim 4, wherein said angle of inclination is under 10°.

6. The gridlike spacer according to claim 1, wherein said legs of one of said springs converge and have ends being spaced apart from one another by a distance enabling a compression of said spring ends upon insertion of said spring into one of said grid meshes.

7. The gridlike spacer according to claim 1, wherein at least one of said spring ends has a profile locking said spring to one of said ribs.

8. The gridlike spacer according to claim 1, wherein said intersecting ribs of one of said meshes are first and second ribs, at least one of said spring ends has first and second lateral tabs, said first tab penetrates an opening formed in said first rib and has at least one notch formed therein for locking said first tab in said opening in said first rib, and said second tab rests on said second rib.

9. The gridlike spacer according to claim 8, wherein said first tab passes through said opening in said first rib twice, and said first tab has at least one second notch for locking said first tab.

10. The gridlike spacer according to claim 8, wherein said second tab also penetrates said opening in said first rib and has at least one notch formed therein for locking said second tab in said opening in said first rib.

11. The gridlike spacer according to claim 8, wherein said tabs are bent into a triangle having one side on which said middle part is located.

12. The gridlike spacer according to claim 8, wherein said ribs have lateral surfaces facing toward and facing away from said grid mesh, said first tab penetrating said first rib rests on said lateral surface of said first rib facing away from said grid mesh, and said second tab rests on said lateral surface of said second rib facing toward said grid mesh.

13. The gridlike spacer according to claim 1, wherein said intersecting ribs of said meshes are first and second ribs, each two of said grid meshes being disposed next to one another and separated by said first rib contain one spring from among the majority of said grid meshes; said spring ends of both of said springs have a side facing away from said first rib being supported on said second rib; and both of said springs have at least one first spring end with a side facing toward said rib having a connecting part joining said two springs and penetrating a first opening formed in said first rib.

14. The gridlike spacer according to claim 13, wherein said connecting part has at least one notch formed therein for locking said connecting part in said first opening in said first rib.

15. The gridlike spacer according to claim 13, wherein in at least one of said springs, said side of said first spring end facing away from said first rib has a first lateral tab supported on said second rib, said first lateral tab penetrates said opening in said first rib and has a notch formed therein for locking said first lateral tab in said first opening in said first rib.

16. The gridlike spacer according to claim 15, including a second lateral tab, said connecting part and said two lateral tabs being bent into an equilateral triangle having a base resting on said second rib and sides on which said middle parts of said springs facing into adjacent ones of said grid meshes are located.

17. The gridlike spacer according to claim 15, wherein at least one of said springs has a second spring end with a side facing away from said rib having a second lateral tab supported on said second rib, said second lateral tab penetrates a second opening formed in said first rib and has a notch for locking said second lateral tab in said second opening formed in said first rib.

18. The gridlike spacer according to claim 13, including another connecting part penetrating a second opening formed in said first rib and joining together two spring ends of both of said springs.

19. The gridlike spacer of 13, including peripheral ribs forming a polygonal cross section of the spacer and at least one corner at which a clamp is fastened, said clamps reaching through an opening formed in one of said spring ends of another one spring from among the majority of said grid meshes.

20. The gridlike spacer according to claim 19, wherein said peripheral ribs are formed of sheet metal and said clamp is welded on the sheet metal of said peripheral ribs forming said at least one corner.

21. In a fuel assembly having rods in a bundle, a gridlike spacer, comprising:
   a) polygonal grid meshes formed by ribs intersecting at corners and extending approximately transversely to the rod bundle between the rods of the rod bundle;
   b) at least one of said ribs being a first rib separating two adjacent ones of said meshes and having an opening connecting said two meshes, one corner of each said two meshes being formed by said first rib and a second rib having an inner side facing toward said two meshes; and
   c) two springs at said corners protruding roughly diagonally into said two meshes, each of said springs having a middle part for laterally supporting a given rod genetrating the respective one of said two meshes, said middle part being an approximately cylindrical segment curved convexly about an axis of curvature at roughly right angles to the rod bundle;
   d) two first legs and two second legs, each middle part of said two springs changing over with a convex curvature into one of said first legs at one of its ends and one of said second legs at its other end;
   e) each leg extending approximately parallel to the rod bundle and having an inner border facing towards said second rib and an outer border facing toward said first rib;
   f) four lateral tabs, each joining said inner border of one of said legs and resting on the inner side of said second rib;
   g) two connecting parts extending through said opening of said first rib and joining the outer border of the first and second legs, respectively; and
   h) the majority of said grid meshes having only one spring point diagonally inward, and two of said ribs facing said diagonally inwardly pointing spring in each of said meshes having at least one stop knob for a rod.

22. The grid like spacer according to claim 21, wherein said opening of said first rib has a profile protruding into at least one notch formed in at least one of the connecting parts.

23. The grid like spacer according to claim 21, wherein at least one of the legs extends along the inner side of said second rib through said opening of said first rib and has at least one notch into which a profile of said opening protrudes.

24. The grid like spacer according to claim 21, wherein at least an additional mesh contains a spring the middle part of which is an approximately cylindric segment changing over into legs like one of the springs of said two adjacent meshes and the inner and outer border of said legs are locked at two ribs forming one corner of that additional mesh.

* * * * *